(12) United States Patent
Bergmann

(10) Patent No.: US 6,249,626 B1
(45) Date of Patent: Jun. 19, 2001

(54) MULTIMODE FIBER OPTICAL POWER MONITORING TAP FOR OPTICAL TRANSMISSION SYSTEMS

(75) Inventor: Ernest Eisenhardt Bergmann, Borough of Fountain Hill, PA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/036,652

(22) Filed: Mar. 6, 1998

(51) Int. Cl.[7] ................................................ G02B 6/30
(52) U.S. Cl. .................................................... 385/48
(58) Field of Search ..................................... 385/30–48

(56) References Cited

U.S. PATENT DOCUMENTS

| | | | |
|---|---|---|---|
| 4,130,343 | 12/1978 | Miller et al. | 385/49 |
| 4,208,094 | * 6/1980 | Tomilinson et al. | 385/16 |
| 4,474,424 | * 10/1984 | Wagner | 385/33 |
| 4,741,615 | 5/1988 | Calzavara et al. | 356/73.1 |
| 5,062,686 | * 11/1991 | Barrow et al. | 385/33 |
| 5,181,264 | * 1/1993 | Chiaretti et al. | 385/33 |
| 5,399,876 | * 3/1995 | LaClair | 250/564 |
| 5,539,577 | * 7/1996 | Si et al. | 359/629 |
| 5,845,023 | * 12/1998 | Lee | 385/33 |

* cited by examiner

Primary Examiner—Akm E. Ullah
(74) Attorney, Agent, or Firm—Wendy W. Koba, Esq.

(57) ABSTRACT

An optical power monitoring tap for use in an optical transmission system advantageously uses existing reflected signal(s) within the transmission system as the "tap" source for the monitor. In particular, one or more multimode fibers are disposed so as to capture reflected signals and directed the reflections into a optical power monitor, such as a PIN photodiode. One or more interfaces within the transmission system (such as a face of an included GRIN lens) provides the reflected signal. In one embodiment, a set of three multimode fibers may be used to capture reflected signals from both an included GRIN lens and isolator component.

16 Claims, 2 Drawing Sheets

MULTIMODE FIBER OPTICAL POWER MONITORING TAP FOR OPTICAL TRANSMISSION SYSTEMS

BACKGROUND OF THE INVENTION

1. Technical Field

The present invention relates to an optical power monitoring tap for use with bulk optic devices and, more particularly, to an optical tap that may be included within a conventional optical subassembly and advantageously utilize pre-existing optical reflections (and possibly enhanced) as the light source for the optical tap.

2. Description of the Prior Art

In many optical subassemblies it is necessary to include an optical tap to monitor the power level of the optical signals passing th rough the optical subassembly. In most cases, the tap introduces additional optical components into the subassembly. For example, a grating, prism or partially reflecting mirror is added to the subassembly and functions to optically "tap" a portion of the light signal passing through the subassembly. While such an arrangement is useful in extracting a portion of the light signal, the introduction of additional optics adds to the cost and complexity of the overall subassembly. Further, the introduction of additional optics results in attenuating the optical signal passing through the subassembly.

SUMMARY OF THE INVENTION

The need remaining in the prior art is addressed by the present invention which relates to an optical power monitoring tap for use with bulk optic devices and, more particularly, to the utilization of a multimode filter as an optical tap that may be included within a conventional optical subassembly to monitor both transmitted and received optical signals.

In accordance with the present invention, a multimode optical fiber is disposed so as to capture the light traveling in the reverse direction through the optical subassembly. The multimode fiber is coupled to a conventional photodetector. By virtue of using a multimode fiber to couple the reflected signal, the photodetector need not be integral with the transmitter, but may be remotely located at a more convenient location.

In an alternative embodiment of the present invention, an additional pair of multimode fibers may be disposed on either side of the transmission fiber. These fibers would be used to capture other optical signals traveling in the reverse direction. This embodiment is particularly useful for arrangements including an optical isolator to test normally attenuated signals passing backward through the isolator assembly.

It is an aspect of the present invention to monitor transmitted signals (by detecting their reflections) as well as signals travelling in the reverse direction through isolators (by detecting portions of the signal outside the region of the single mode fiber).

Other and further aspects of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
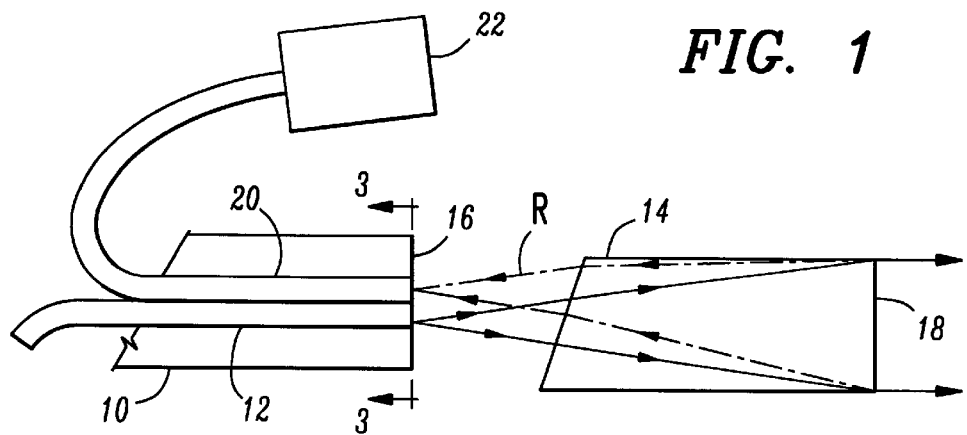
FIG. 1 illustrates a side view of a portion of an exemplary optical transmitter including the optical tap of the present invention.
Figure 2:
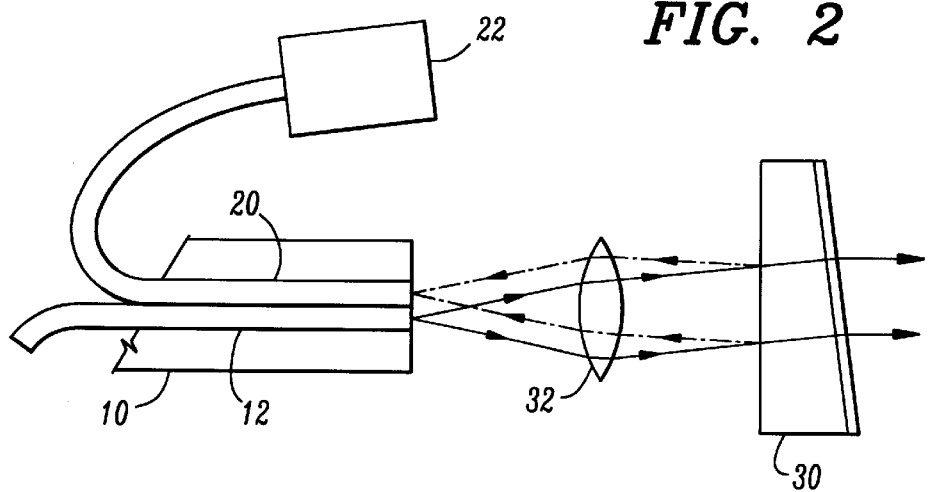
FIG. 2 is a side view of an alternative embodiment of the present invention, utilizing an alternative optical element as a tap source.

FIG. 1 illustrates a portion of a typical optical transmission system, including a ferrule 10 for holding a single mode transmission fiber 12 in precise alignment with the transmission system optics. Also illustrated is a bulk optic element, such as a graded-index (GRIN) lens 14. In operation of the transmission system, the optical signal would exit single-mode fiber 12 at endface 16 of ferrule 10, then pass through GRIN lens 14. As is well-known in the art, a graded-index lens such as GRIN lens 14 can be used to collimate the signal passing therethrough. As the optical signal impinges rear surface 18 of GRIN lens 14, a portion (relatively small, usually no more than 10%) of the signal will be reflected, as indicated by the arrows in FIG. 1. The reflected signal portion (hereinafter referred to as the "deflected" signal) will be a function of the characteristics of the reflecting surface. For example, if the surface includes a partially reflective coating instead of an anti-reflective (AR) coating, a greater amount of the signal will be reflected. If an anti-reflective (AR) coating is used, a lesser amount will be reflected. Although the reflecting element in FIG. 1 is illustrated as a GRIN lens, it is to be understood that any bulk optic element may be used as the "deflecting" surface for the purposes of the present invention. In particular, FIG. 2 illustrates an alternative embodiment of the present invention that utilizes a filter element 30 as the deflecting device. As with the arrangement of FIG. 2, filter element 30 of FIG. 2 will allow for a portion of the transmitted signal to be "deflected" and follow a return path as shown by the dotted lines.

Referring back to FIG. 1, a multimode fiber 20 is positioned within ferrule 10 to capture the deflected signal. Multimode fiber 20 may be any desired length, where an optical power monitor 22 is coupled to process this deflected signal. Since the percentage of the forward directed signal that will be deflected is known, the measurement of the power level of the deflected signal will provide an excellent indication of the strength of the forward-directed signal. Optical power monitor 22 may include, for example, a PIN photodiode and the electronics necessary to form an indication of the power of the signal. Advantageously, optical power monitor 22 may be remotely located and does not need to be incorporated into the package of the optical transmitter itself. By using a multimode fiber as the optical tap, the positioning of the endface of fiber 20 vis-a-vis fiber 12 is not especially critical.

Figure 3:
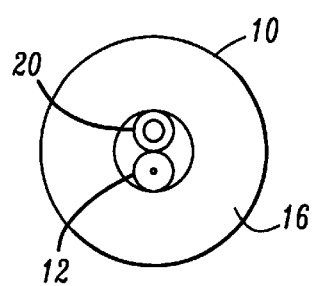
FIG. 3 is a cut-away front view of an exemplary ferrule termination, taken along line 3—3 of the arrangement of FIG. 1, illustrating in particular the location of the multimode tap fiber with respect to the single mode transmission fiber.

A view of the endface 16 of ferrule 10 is shown in FIG. 3, illustrating in particular the location of the endface of transmission fiber 12 with respect to the endface of multimode tap fiber 20. As shown, multimode tap fiber 12 is disposed above single mode transmission fiber 12.

Figure 4:
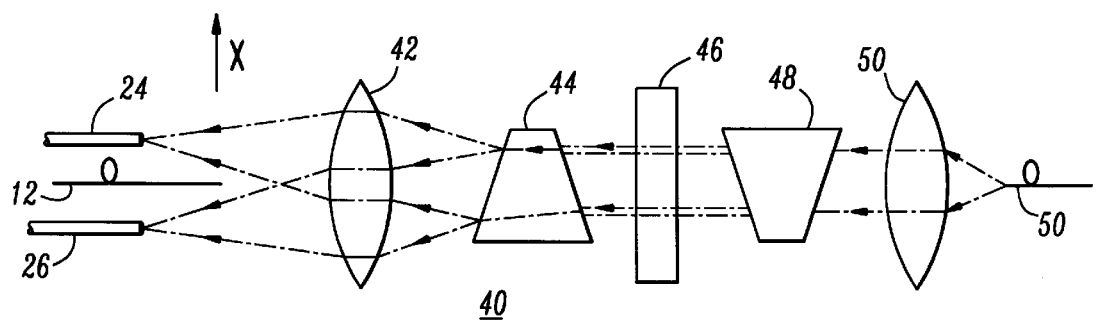
FIG. 4 illustrates an exemplary isolator arrangement wherein reverse-directed optical signals collected by multimode tap fibers disposed on either side of transmission fiber.
Figure 5:
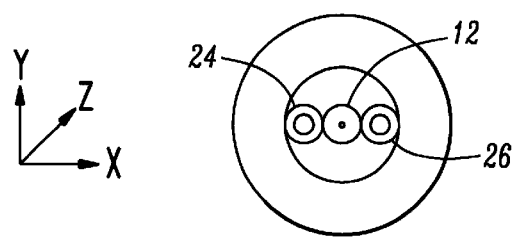
FIG. 5 is a side view of the arrangement of FIG. 4, taken along line 4—4.

As mentioned above, an alternative embodiment of the present invention utilizes a pair of multimode fibers to capture the deflected optical signal. FIG. 4 illustrates an exemplary optical isolator 40 arrangement wherein the deflected signal propagates into a pair of multimode fibers 24 and 26. In this arrangement, the signal coupled into fibers 24 and 26 is used to monitor the power traveling backward through the isolator elements 44, 46, 48 and 50. The utilization of this pair of multimode fibers will capture any reverse-propagating signal. The additional monitoring provided by this pair of taps will further detail the information collected regarding optical signals travelling in the reverse direction from output fiber 52. FIG. 5 illustrates a ferrule endface view of this arrangement. In particular, multimode fibers 24 and 26 are disposed on either side of transmission fiber 12, along the X-axis as noted in FIG. 5. These multimode fibers could be combined at a common second power monitor, or coupled to separate power monitors (not shown).

Figure 6:
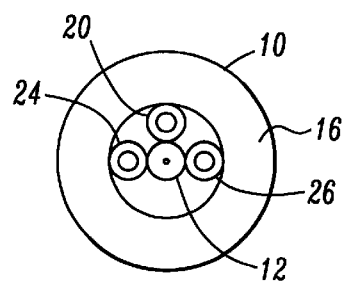
FIG. 6 is a side view of an alternative embodiment, incorporating the multimode tap fibers of Moth above-described embodiments.

It is to be understood that the multimode fiber taps discussed above in separate embodiments may indeed be combined. An end view of a ferrule 10 including both multimode fiber tap 20, as discussed in association with FIG. 1, and the pair of isolator multimode tap fibers 24 and 26, as discussed in association with FIG. 4, is illustrated in FIG. 6. In general, an optical power monitoring tap of the present invention may use any number of multimode fibers disposed to surround the single mode transmission fiber.

Various other embodiments not described above are considered to fall within the scope of the present invention. For example, the signal fiber and tap fibers may be fixed within a device other than a ferrule. Other variations will occur to those skilled in the art and are considered to fall within the scope of the present invention as defined by the appended claims.

What is claimed is:

1. An optical power monitoring tap for use with an optical transmission system comprising a transmission fiber disposed along an optical axis and including a bulk optic device capable of producing a deflected optical signal away from said optical axis, said optical power monitoring tap comprising:

at least one multimode optical fiber disposed such that the deflected optical signal is coupled into said at least one multimode optical fiber and thereafter propagates along said at least one multimode optical fiber; and a detecting means coupled to the at least one multimode optical fiber for translating said deflected optical signal into an electrical signal, said electrical signal thereafter utilized to monitor the optical power of the optical transmission system.

2. An optical power monitoring tap as defined in claim 1 wherein the deflected signal is provided by a partially reflective surface within the optical transmission system.

3. An optical power monitoring tap as defined in claim 1 wherein the deflected optical signal is produced by diffraction within the optical transmission system.

4. An optical power monitoring tap as defined in claim 1 wherein the deflected optical signal is produced by scattering within the optical transmission system.

5. An optical power monitoring tap as defined in claim 1 wherein the deflected optical signal is provided by non-reciprocal components within the optical transmission system.

6. An optical power monitoring tap as defined in claim 5 wherein the non-reciprocal components are included within an isolator.

7. An optical power monitoring tap as defined in claim 1 wherein the at least one multimode optical fiber comprises a pair of multimode optical fibers disposed to capture portions of a reverse propagating optical signal and at least one detection means coupled to the pair of multimode optical fibers to convert the deflected optical signal into an electrical signal.

8. An optical power monitoring tap as defined in claim 7 wherein each multimode fiber is coupled to a separate detection means.

9. An optical power monitoring tap as defined in claim 1 wherein the optical system includes a fiber ferrule for supporting the transmission fiber and the at least one multimode optical fiber.

10. An optical power monitoring tap as defined in claim 9 wherein the optical system includes a fiber ferrule for supporting the transmission fiber and a pair of multimode optical fibers.

11. An optical power monitoring tap as defined in claim 9 wherein the multimode fiber is disposed contiguous with the transmission fiber.

12. An optical power monitoring tap as defined in claim 9 wherein the at least one multimode comprises a plurality of multimode fibers disposed within the fiber ferrule.

13. An optical power monitoring tap as defined in claim 12 wherein a pair of multimode fibers are disposed on either side of the transmission fiber.

14. A method of monitoring an optical signal within an optical transmission system, the method comprising the steps of:

a) transmitting an optical signal through a single mode fiber along an optical axis and into the optical transmission system, b) deflecting a portion of the transmitted signal off of an optical component within the optical transmission system away from the optical axis;

c) capturing the deflected signal within a multimode fiber disposed in proximity to the transmission single mode fiber.

15. The method according to claim 14 wherein the method further comprises the step of:

d) detecting the deflected signal within a photodetector to monitor the optical power of the optical transmission system.

16. The method according to claim 14 wherein in performing step c), a pair of multimode fibers are used to capture any reverse propagating signals entering the transmission system.

* * * * *